(12) United States Patent
Chang et al.

(10) Patent No.: US 6,468,489 B1
(45) Date of Patent: Oct. 22, 2002

(54) APPARATUS AND METHOD FOR DECREASING CONTAMINANTS PRESENT IN A GAS STREAM

(75) Inventors: Ramsay Chang, Los Altos, CA (US); Sharon Sjostrom, Denver, CO (US); Richard Slye, Denver, CO (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 117 days.

(21) Appl. No.: 09/784,407

(22) Filed: Feb. 13, 2001

Related U.S. Application Data

(63) Continuation-in-part of application No. 09/371,256, filed on Aug. 10, 1999, now Pat. No. 6,267,940.

(51) Int. Cl.$^7$ .............................. C01B 8/00; B01D 53/56
(52) U.S. Cl. .................... 423/239.1; 422/168; 422/169; 422/189; 422/232; 422/233
(58) Field of Search ................................. 422/168, 169, 422/189, 232, 233; 423/237, 239.1, 245.1; 502/5, 522

(56) References Cited

U.S. PATENT DOCUMENTS 6,117,403 A  *  9/2000  Alix et al. ............... 204/157.3
6,153,159 A  *  11/2000  Engeler et al. ............. 423/210

* cited by examiner

*Primary Examiner*—Stanley S. Silverman
*Assistant Examiner*—Maribel Medina
(74) *Attorney, Agent, or Firm*—Pennie & Edmonds LLP

(57) ABSTRACT

The apparatus comprises a $NO_X$ reducing unit, a duct to receive a flue gas stream from said $NO_X$ and reducing unit, and an activation source associated with the duct. In use, the activation source applies energy to the flue gas stream to facilitate the removal of contaminants from the flue gas stream. Further, the method comprises providing an activation source is downstream of a $NO_X$ reducing unit. The activation source is then activated to facilitate the removal of contaminants from the flue gas stream.

20 Claims, 5 Drawing Sheets

APPARATUS AND METHOD FOR DECREASING CONTAMINANTS PRESENT IN A GAS STREAM

This is a continuation-in-part of U.S. patent application Ser. No. 09/371,256 filed Aug. 10, 1999 now U.S. Pat. No. 6,267,940.

BRIEF DESCRIPTION OF THE INVENTION

This invention relates generally to the control of pollutants from combustion processes. More particularly, this invention relates to a technique for enhancing $NO_X$ reducing catalyst activity and thereby efficiently removing $NO_X$ from a combustion process gas stream.

BACKGROUND OF THE INVENTION

The 1990 Clean Air Act Amendments require major sources of air emissions to limit the discharge of $NO_X$. $NO_X$ is present in the flue gas emitted from combustion processes. Therefore, cost-effective methods for controlling $NO_X$ are of significant interest.

Selective Catalytic Reduction (SCR) and Selective Non-Catalytic Reduction (SNCR) catalysts for $NO_X$ removal are known in the art. Conventional $NO_X$ SCR catalysts require large amounts of catalyst and the flue gas stream to be at relatively high temperatures (between approximately 300 to 400° C.) in order to have sufficient activity for effective $NO_X$ reduction. In such schemes, ammonia or urea are also typically added as a reducing agents. However, significant problems are associated with the use of reducing agents, including, for example the formation of ammonium compounds from ammonia, referred to as ammonia "slip." Ammonia "slip" occurs when unreacted ammonia and ammonium compounds pass out of the SCR unit. Such ammonia "slip" can plug downstream air heaters and impact ash use and disposal. SNCR is not as effective as SCR processes and the use of urea in SNCR also produces unwanted ammonia and ammonium compounds. Therefore, it would be desirable to have a process than can supplement $NO_X$ reduction downstream of the SCR/SNCR process, where the process can also reduce ammonia slip.

In addition to SCR and SNCR, low $NO_X$ burners (LNB) positioned in the furnace are also commonly used for $NO_X$ reduction. However, the LNB's are not as effective as SCR/SNCR at removing $NO_X$ from the combustion process. Therefore, it would also be desirable to have a process that can supplement $NO_X$ reduction downstream of LNB burners to meet more stringent $NO_X$ emissions control requirements.

There are ongoing efforts to develop low temperature catalysts for applications between approximately 100 to 250° C. Unfortunately, these low temperature catalysts are sensitive to high $SO_x$ concentrations in the flue gas. There are also $NO_X$ SCR catalysts being developed that are reagentless, so, for instance, ammonia is not required as a reducing agent. These catalyst systems can benefit from the imposition of additional and alternative activating agents to the catalyst so that they can operate at lower temperatures, be less sensitive to poisoning agents, and more reactive without the addition of chemical agents.

In view of the foregoing, it would be highly desirable to provide an approach to enhance $NO_X$ removal. Ideally, the technique would reduce the amount of catalyst needed, or would operate at relatively low temperatures, or reduce the amount of required chemical reducing agents.

SUMMARY OF THE INVENTION

According to the invention there is provided an apparatus for decreasing the concentration of contaminants, such as $NO_X$ or reducing agents, present in a gas stream. The apparatus comprises a $NO_X$ reducing unit, a duct to receive a flue gas stream from said $NO_X$ and reducing unit, and an activation source associated with the duct. In use, the activation source applies energy to the flue gas stream to facilitate the removal of contaminants from the flue gas stream.

Further, according to the invention there is provided a method of decreasing the concentration of contaminants within a flue gas stream. An activation source is provided downstream of a $NO_X$ reducing unit. The activation source is associated with a duct configured to convey a flue gas stream. The activation source is then activated to facilitate the removal of contaminants from the flue gas stream.

In this way, the inclusion of an activation source downstream of a $NO_X$ reducing unit decreases the concentration of $NO_X$ and reducing agents within the flue gas stream. The activation source of the invention may also be used with a low $NO_X$ burner to reduce $NO_X$ even in the absence or reducing agents that are present in other embodiments of the invention.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF THE INVENTION

Figure 1:
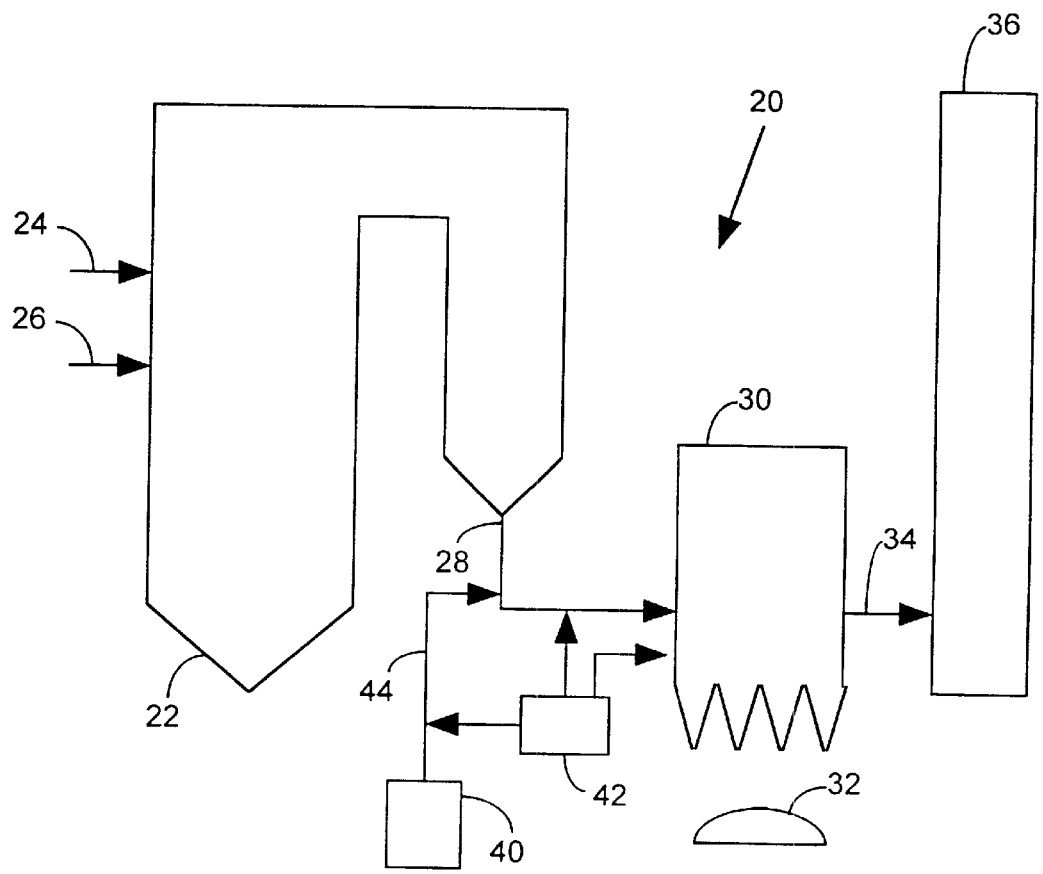
FIG. 1 illustrates a $NO_X$ reduction apparatus constructed in accordance with a first embodiment of the invention.

FIG. 1 illustrates a pollution removal system 20 for use with a combustion source, such as a fossil-fuel-fired boiler 22, which receives air through an air inlet duct 24 to combust fuel, such as coal received through a fuel inlet duct 26. The combustion process within the boiler 22 produces a gas stream in the form of flue gas which exits the boiler 22 through an outlet duct 28. The flue gas produced within the boiler 22 is comprised of air, products of combustion in the gaseous form, such as water vapor, carbon dioxide, oxides of nitrogen and sulfur, halides, organic compounds, mercury, selenium and other trace metal vapors and particulate matter. A particulate collection device 30 is connected to the outlet duct 28 and removes particulate matter 32 from the flue gas. The particulate collection device outlet duct 34 directs the flue gas to the stack 36 where it is discharged.

The power plant components discussed up to this point are conventional. The invention is directed toward supplementing the operation of these components to include a process wherein a $NO_X$ reducing catalyst is used to remove $NO_X$ from flue gas in the outlet duct 28. The invention utilizes a $NO_X$ reducing catalyst injector 40 to inject a $NO_X$ reducing catalyst powder into the outlet duct 28. A separate activation source 42 is used to activate the $NO_X$ reducing catalyst while it is in the output duct 28 and/or in the particulate collection device 30.

The combination of the catalyst injection 40 and activation source 42 enhance the activity of the $NO_X$ reducing catalyst and enable significant $NO_X$ reduction in the duct 28 and the particulate collection device 30. The invention also allows a $NO_X$ reducing catalyst to be used at relatively low temperatures, e.g., between approximately 100 to 250° C.

The $NO_X$ reducing catalyst injector 40 may be implemented as any standard particle injector. The activation source 42 is implemented as an energy producing mechanism. The energy created by the energy producing mechanism activates the $NO_X$ reducing catalyst. The energy producing mechanism may be implemented to create an electrical field across the catalyst surface. The catalyst structure may also be irradiated with electromagnetic energy, such as microwave radiation, ultraviolet radiation, or infrared radiation. The activation source 42 may also be implemented to produce a magnetic field.

Those skilled in the art will appreciate that the foregoing activation techniques may be used alone or in combination. The underlying principle of the activation technique is to render the $NO_X$ reducing catalyst sufficiently active through supplemental and alternative energy input and excitation energies so that lower amounts of catalyst are needed or the catalyst can operate in a relatively low temperature (between approximately 100 to 250° C.) flue gas stream.

In one embodiment of the invention, the catalyst injector 40 injects a fine $NO_X$ catalyst powder into the duct 44 and the output duct 28. The catalyst powder is irradiated by electromagnetic waves produced by the activation source 42. This irradiation may occur in the duct 44 and/or the output duct 28. The fine catalyst powder is then captured in the downstream particle collection device 30, which may be a baghouse or electrostatic precipitator, where the powder may be further irradiated with electromagnetic waves to continue the reaction with $NO_X$. In this embodiment, the $NO_X$ in the gas stream reacts with the catalyst suspended in the gas stream as well as when the catalyst is deposited on the surface of the filter bags or precipitator.

Figure 2:
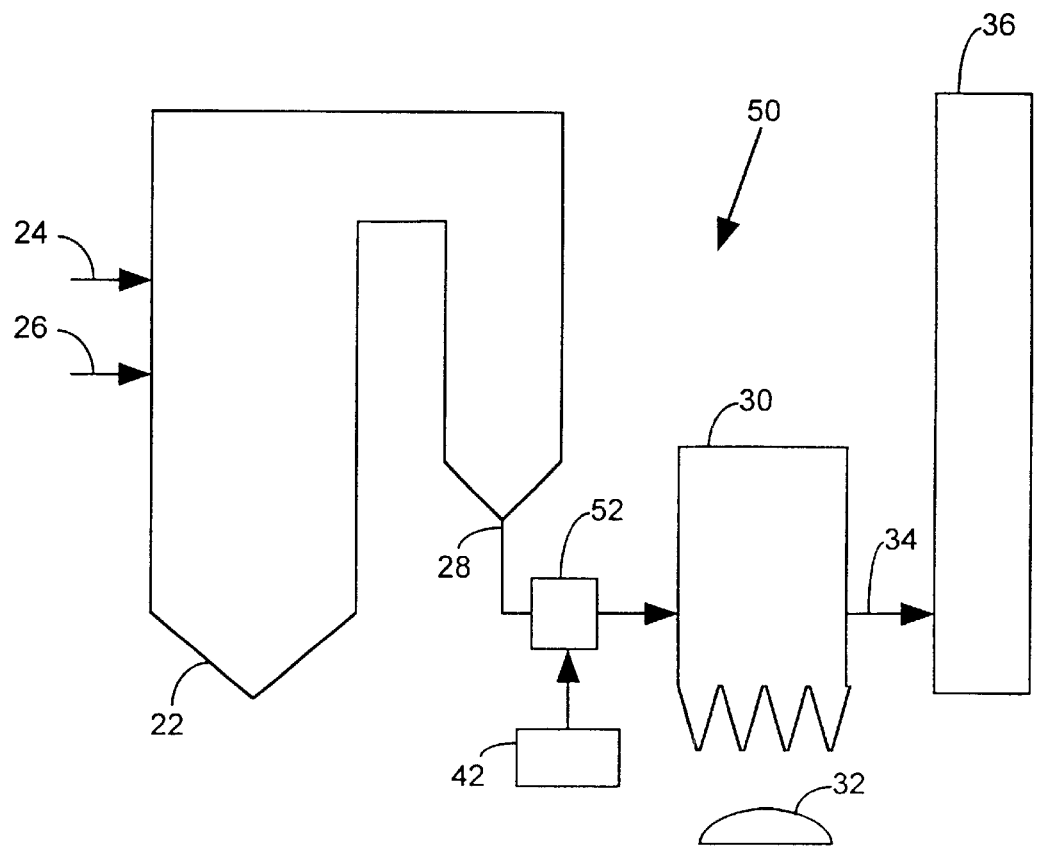
FIG. 2 illustrates a $NO_X$ reduction apparatus constructed in accordance with a second embodiment of the invention.

FIG. 2 illustrates an alternate embodiment of the invention. The apparatus 50 of FIG. 2 corresponds to the apparatus of FIG. 1, except in FIG. 2, a catalyst injector is not used. Instead, a $NO_X$ reducing catalyst structure 52 is placed in the output duct 28. The structure 52 is activated by the activation source 42. The structure 52 may be implemented as a honeycomb-shaped structure or as a set of parallel plates. $NO_X$ in the gas stream is reduced to harmless nitrogen (with or without added reagents, such as ammonia, methane, or hydrogen) as the gas stream passes over the catalyst structure.

Figure 3:
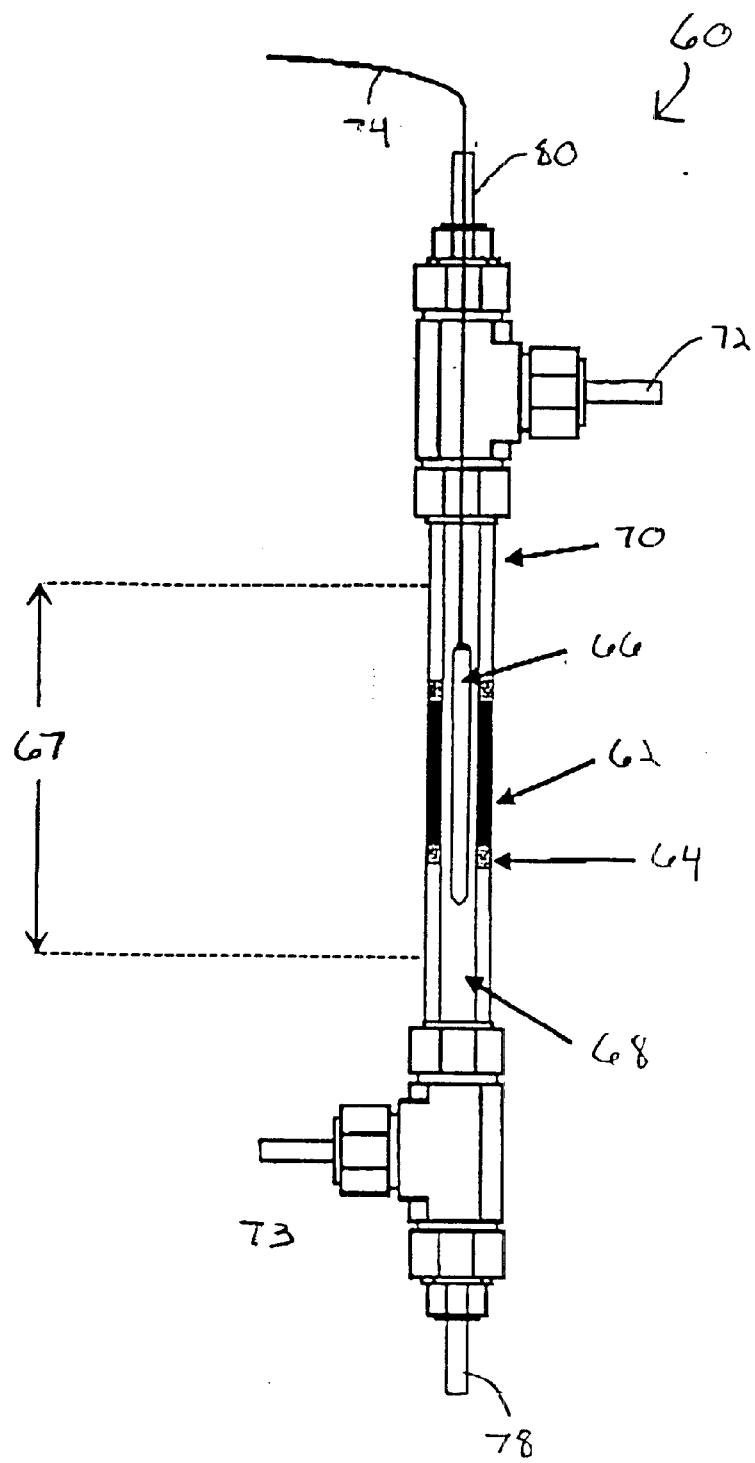
FIG. 3 illustrates a testing apparatus used to establish the efficacy of the technique of the invention.

FIG. 3 illustrates a test apparatus 60 used to substantiate the effectiveness of the invention. The test apparatus 60 includes a catalyst 62 positioned between quartz wool barriers 64. An ultraviolet light source 66 is used to irradiate the catalyst 62 in a heating zone 67.

The test apparatus 60 further includes an inner quartz tube 68 and an outer pyrex tube 70. A input port 72 receives a controlled flow of gas, which is discharged at output port 73. A wire 74 delivers power to the ultra violet light source 66. An air input port 78 receives pumped air, which is discharged at an air output port 80.

In one embodiment, the catalyst 62 was prepared by the decomposition of metal nitrates (Catalyst I) or other water soluble species on a support. An aqueous solution containing amounts of metal nitrates in concentration ratios appropriate to obtain a desired catalyst stoichiometry was used. The solution was added drop-wise to a support (silica gel, large pore, −8 mesh, 300 m$^2$/g) until excess of the liquid just appeared (incipient wetness impregnation). In the case of a $V_2O_5$-$TiO_2$SCR catalyst (Catalyst II), ammonium metavanadate ($NH_4VO_3$) was used as the vanadium oxide source.

The reactor employed in evaluating these systems is shown in FIG. 3. The following points are noteworthy: 1) products were monitored with electrochemical $NO_X$ sensors; 2) the flow rates of the gases He, NO, and $O_2$ through ports 72 and 73 were controlled with precision metering valves and measured with flow meters; 3) the reactor consisted of a straight quartz tube 68 with a 12 mm outside diameter, which housed the UV source 66 and an outer Pyrex tube 70 of inside diameter 15.8 mm in between which the catalyst 62 was packed between two pieces of quartz wool 64; and 4) the reactor was heated using a temperature controlled furnace. The catalyst 62 was a powder of weight 1.15 g and a volume of 2.0 cm$^3$. Space velocities reported here were based on the reactor volume occupied by the catalyst 62. A description of the analysis techniques that were utilized is presented in the following paragraphs.

$NO_X$ sensors (not shown) were used in connection with the apparatus of FIG. 3. Both NO and $NO_2$ were measured electrochemically using conventional sensors. The sensors were operated in parallel using Helium (He) as a carrier gas. The He flow was adjusted by a needle valve to approximately 10 mL/min. Samples were introduced with a syringe through injection ports located in the gas stream immediately before each sensor. The gas flow lines through the sensors were made of polytetrafluroethylene to reduce surface adsorption of $NO_2$.

Gas chromatography (GC) was used to quantify the products of $NO_X$ decomposition (nitrogen and nitrous oxide). An HP 5890 Series II gas chromatograph equipped with a thermal conductivity detector (TCD) and a CTR I column operating at a temperature of 30° C. and using a helium carrier gas was used. A sampling value equipped with a 2 ml sample loop was employed.

Activity data obtained for catalysts evaluated at 350° C. are summarized in Table 1.

TABLE 1

Data for UV Activation of $NO_x$ Reducing Catalysts. T = 100° C. λ = 254 nm.

| CATALYST | UV Activation | ppm NO & $NO_2$ | % $O2$ | Reducing Agent | % NO & $NO_2$ Removed | ppm $NO_2$ Produced | Space Velocity (hr$^{-1}$) |
|---|---|---|---|---|---|---|---|
|  | Off | 665 | 0 | 0 | 0.6 | 0.0 | 432 |
|  | On | 738 | 0 | 0 | 28.7 | 32 | 432 |
|  | Off | 596 | 1.42 | 0 | −2.9 | 30 | 522 |

TABLE 1-continued

Data for UV Activation of $NO_x$ Reducing Catalysts. T = 100° C. λ = 254 nm.

| CATALYST | UV Activation | ppm NO & $NO_2$ | % $O_2$ | Reducing Agent | % NO & $NO_2$ Removed | ppm $NO_2$ Produced | Space Velocity ($hr^{-1}$) |
|---|---|---|---|---|---|---|---|
| Catalyst I | On | 576 | 1.42 | 0 | −6.2 | 233 | 522 |
| (11.1 wt. % | Off | 554 | 0 | 0 | 6 | −1 | 4340 |
| $Sr_2Bi_2Cu_2O_2$/silica gel) | On | 527 | 0 | 0 | 6.7 | 15 | 4340 |
| | Off | 593 | 0 | 0 | 5.6 | 0 | 5296 |
| | On | 558 | 0 | 0 | 11.1 | 22 | 5296 |
| | Off | 674 | 2.67 | 0 | 2.5 | 3 | 5147 |
| | On | 678 | 2.67 | 0 | 4.1 | 71 | 5147 |
| | Off | 3 | 0 | 0 | 50.0 | 0 | 580 |
| | Off | 2 | 0 | 0 | −50.0 | 2 | 580 |
| | Off | 2 | 2.50 | 0 | 0.0 | 0 | 536 |
| | On | 3 | 2.50 | 0 | −33.9 | 2 | 536 |
| | Off | 544 | 0.0 | 351 ppm CO | 3.1 | 2 | 1077 |
| | On | 509 | 0.0 | 351 ppm CO | 1.8 | 58 | 1077 |
| | Off | 811 | 2.50 | 373 ppm CO | −2.8 | 31 | 1012 |
| | On | 813 | 2.50 | 373 ppm CO | −6.6 | 233 | 1012 |
| | Off | 823 | 3.01 | 941 ppm CO | 0.0 | 33 | 1037 |
| | On | 767 | 3.01 | 941 ppm CO | −11.0 | 239 | 1037 |
| | Off | 641 | 2.68 | 509 ppm $NH_3$ | 5.9 | 3 | 945 |
| | On | 636 | 2.68 | 509 ppm $NH_3$ | 38.4 | 51 | 945 |
| | Off | 430 | 1.79 | 574 ppm $NH_3$ | 0.0 | 0 | 1416 |
| | On | 439 | 1.79 | 574 ppm $NH_3$ | 37.7 | 36 | 1416 |
| Catalyst II | Off | 550 | 0.0 | 0 | 1.6 | −2 | 430 |
| 1.2% $V_2O_5$ on $TiO_2$ | On | 509 | 0.0 | 0 | 8.1 | 0 | 494 |
| | Off | 491 | 2.57 | 0 | −5.6 | 10 | 589 |
| | On | 516 | 2.57 | 0 | 8.9 | 6 | 589 |
| | Off | 460 | 2.57 | 0 | 0.4 | −1 | 959 |
| | Off | 468 | 0.0 | 0 | 5.7. | 2 | 976 |
| | On | 445 | 1.83 | 0 | 8.2 | 4 | 976 |
| | Off | 636 | 2.38 | 444 ppm $NH_3$ | 5.9 | −2 | 867 |
| | On | 612 | 2.38 | 444 ppm $NH_3$ | 38.7 | −4 | 867 |
| | Off | 444 | 1.26 | 742 ppm $NH_3$ | 0.0 | 0 | 1635 |
| | On | 442 | 1.26 | 742 ppm $NH_3$ | 33.5 | −1 | 1635 |
| | Off | 453 | 0 | 0 | 0.0 | 0 | 4938 |
| | On | 526 | 0 | 0 | 6.7 | −1 | 4938 |
| | Off | 552 | 2.95 | 0 | 0.0 | 7 | 5137 |
| | On | 559 | 2.95 | 0 | 8.0 | 4 | 5137 |
| | Off | 633 | 4.92 | 496 ppm $NH_3$ | 8.8 | 2 | 1021 |
| | On | 573 | 4.92 | 496 ppm $NH_3$ | 41.4 | −9 | 1021 |
| | Off | 588 | 2.11 | 488 ppm $NH_3$ | 14.5 | −4 | 849 |
| | On | 656 | 2.11 | 488 ppm $NH_3$ | 62.2 | 20 | 849 |

Several general observations are apparent from the above table. First, appreciable differences in activity were observed when the UV source was in the "On" versus the "Off" state. Two, in the absence of oxygen, a net removal of nitrogen oxides (NO+$NO_2$) via UV activation was observed over a space velocity range of 400–5300 $h^{-1}$. Three, Catalyst II exhibited less $NO_2$ production than Catalyst I when $O_2$ was introduced. Four, apparently negative conversions resulted from the storage of $NO_2$ in the catalyst. Finally, activity was still evident after over 1000 hours on-line.

Some discussion of the nature of the UV activation process follows. Reagentless reactions are considered first. The observations concerning reagentless reactions absent added oxygen are as follows: 1) $NO_2$ was not produced in great abundance and 2) the order of activity was $Sr_2 Bi_2Cu_2O_7$/silica gel>$V_2O_5$/$TiO_2$. Introducing 1–3% $O_2$ gave the result that the net conversion of NO+$NO_2$ displayed the order $V_2O_5$/$TiO_2$>$Sr_2$ $Bi_2Cu_2O_7$/silica gel. In the case of Catalyst I, $NO_2$ was produced extensively. CO was found to be an ineffective reagent. In the case of both $V_2O_5$/$TiO_2$ and $Sr_2$ $Bi_2Cu_2O_7$/silica gel, it was found that ammonia was an effective reagent for the UV activation of nitrogen oxides. In the case of $V_2O_5/TiO_2$, the disappearance of nitrogen oxides was fully accounted for in terms of the products of ammonia reduction. The product distribution was $N_2$ (95%) and $N_2O$ (5%). It is not likely that scissioning of the N—O bond by direct interaction with the radiation occurs since the difference in energies between LUMO (Lowest Unoccupied Molecular Orbital) and HOMO (highest Occupied Molecular Orbital) was less than the source energy (4.0 eV) of the 254 nm UV lamp. Rather, substrate excitation or excitation of a substrate-NO complex must occur. Decomposition in the absence of oxygen occurs according to the following mechanism:

$$2e^- + V + NO = N + O^{2-}$$

$$2N = N_2$$

In the case of oxidation, UV radiation probably serves to excite hole states, leading to the following important steps:

$$M\text{—}O + h\nu = 2h^+ = M\text{—}O$$

$$2h^+ + O^{2-} = O + V$$

$$NO + O = NO_2$$

In the case of the silica supported catalysts, the ammonia reagent probably works by its reaction with $NO_2$ formed by UV excitation, since the dioxide species is formed over both of the catalysts in the presence of oxygen when the catalyst is irradiated with ultraviolet light. The mechanism in the case of $V_2O_5/TiO_2$ is clear, since UV does not cause $NO_2$ to be generated.

The foregoing results demonstrate conversion via a nonoxidative pathway has been obtained using ultraviolet activation of nitrogen oxides. Although the conversion may be low relative to current $NO_X$ catalysts, it must be remembered that the catalysts employed here were not optimal: strongly basic catalysts are not expected to be effective at promoting SCR. For example, it is well known that bases including alkali and alkaline earths poison SCR catalysts. In contrast, catalysts found to display significant and even potentially useful activity absent reagents, demonstrated a preferred oxidative pathway under UV irradiation when oxygen was introduced into the system. This is in sharp distinction to the behavior exhibited by the catalysts in thermal catalytic activation of $NO_2$. In that case, the catalysts removed NO essentially completely through a nonoxidative pathway, with a nitrogen product.

In sum, the foregoing data demonstrates UV activation as a tool for the nonoxidative removal of NO from an exhaust stream containing up to 5% $O_2$. Reagentless decomposition was demonstrated in the absence of oxygen. However, there was a marked tendency for the reagentless catalysts to produce $NO_2$ in the presence of $O_2$. In the presence of oxygen, ammonia present in a 0.7 to 1.5:1 ratio with respect to $NO + NO_2$ resulted in the essentially complete reduction of NO. One of these basic catalysts were found to be more active than an SCR catalyst.

The foregoing results indicate that UV radiation is effective for the nonoxidative activation of nitrogen oxides at low temperature (e.g., 100° C.). In particular, the use of a reagent (ammonia) was found to be effective in the UV activation of $NO_X$. The results point to certain steps that can be taken to optimize performance of the process. For example, increasing wavelength may reduce the tendency to oxidize NO and allow for possible use in reagentless or reduced-reagent catalysis. Catalyst optimization may also be considered to improve performance with specific wavelengths or wavelength ranges. Catalyst distribution may also be considered to improve exposure to radiation.

Those skilled in the art will appreciate that the invention provides a technique for promoting catalytic activity in various $NO_X$ SCR catalysts so that they can be operated and installed under conditions where they would not normally be active and may therefore provide more cost-effective options for $NO_X$ reduction in gases. The invention facilitates the use of catalysts at lower temperatures. The invention renders the catalysts less sensitive to poisoning agents, and otherwise more reactive, even without the addition of chemical agents. The $NO_X$ reduction technique of the invention is cost-effective, thereby minimizing the overall cost of generating electricity in fossil-fired power plants.

For ease of explanation, the abovementioned apparatus, which uses a catalyst structure and an activation source, will hereafter be referred to as an Advanced Energy Activation (AEA) unit. As mentioned previously, an AEA unit activation source may include an ultraviolet (UV) energy source, an electromagnetic energy source, a microwave energy source, an electric field energy source, an electric current energy source, a magnetic field energy source, and an infrared energy source. Some of these AEA activation sources also act to heat the catalyst to an elevated and more reactive temperature. The AEA unit activation sources, therefore, render an AEA unit catalyst sufficiently active through supplemental and alternative energy input and excitation energies so that an AEA unit can be operated and installed under conditions where it would not normally be active. This provides a more cost-effective reduction of $NO_X$ flue gases.

During laboratory and field studies of AEA units, it was found that using a supplemental activation source downstream of existing $NO_X$ reduction units, such as SNCR, SCR, LNB, or AEA units, reduces any $NO_X$ present in the system, and also reduces "slip" caused by reducing agents, such as ammonia or urea, by promoting reactions between $NO_X$ and reducing agents. Therefore, a supplemental activation source is preferably used downstream of an SNCR, SCR, or LNB unit as a $NO_X$ polishing step.

Figure 4:
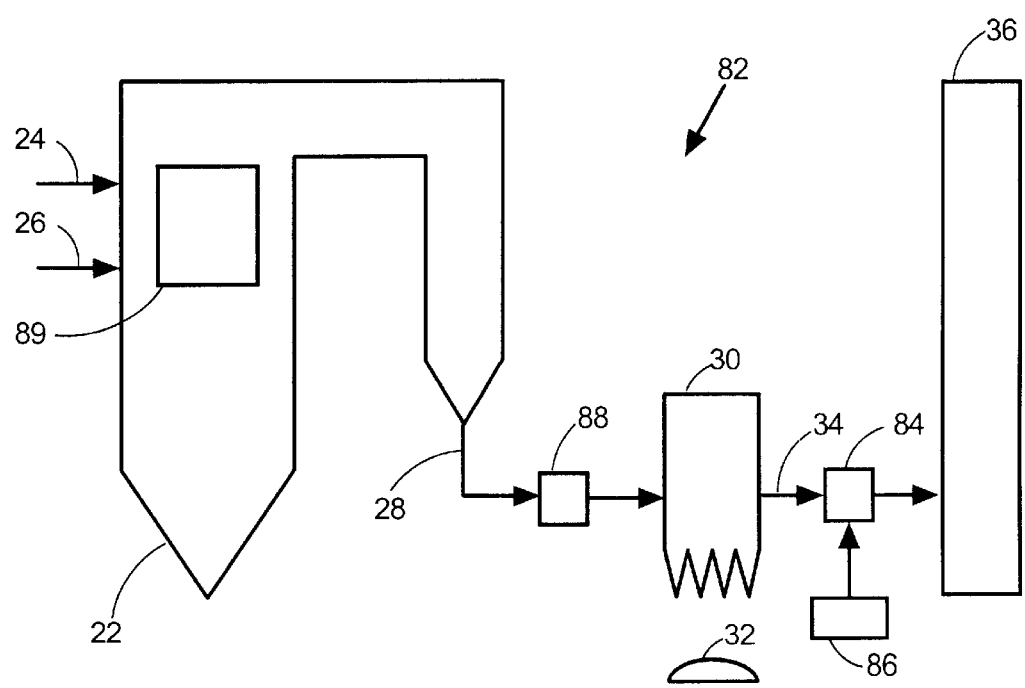
FIG. 4 illustrates a system for decreasing the concentration of contaminants within a gas stream in accordance with an embodiment of the invention.

FIG. 4 illustrates a system 82 for decreasing the concentration of contaminants, such as $NO_X$ or reducing agents, present in a flue gas stream in accordance with an embodiment of the invention. In one embodiment, a supplemental activation source 86 is placed outside of, or within, a duct leading from the boiler to the stack 36. The supplemental activation source is preferably situated downstream of a $NO_X$ reducing unit, such as a SNCR, SCR, or AEA unit 88, or a LNB unit 89. Alternatively, the supplemental activation source may be situated anywhere downstream of the $NO_X$ reducing units 88 or 89, including just downstream of boiler 22, downstream of SNCR, SCR, or AEA unit 88, or between the particulate collection device 30 and the stack 36. The supplemental activation source 86 may also be placed in the particulate collection device 30.

The energy provided by the supplemental activation source 86 serves to reduce "slip" caused by reducing agents, such as ammonia or urea, by promoting reactions between $NO_X$ and the reducing agent. The reducing agent may be suspended in the flue gas stream or it may be on flyash surfaces. This not only reduces ammonia "slip", but also reduces $NO_X$ present in the flue gas by promoting a reaction between the $NO_X$ and the reducing agents.

It has also been demonstrated that $NO_X$ in the flue gas can be further reduced by the supplemental activation source 86 even in the absence of reducing agents, such as ammonia or urea. Furthermore, should any catalyst powder be present in the flue gas at the supplemental activation source 86, such as if injected at a $NO_X$ SNCR, SCR, or AEA unit 88, any $NO_X$ present in the flue gas will react with the catalyst to further reduce any $NO_X$ present in the flue gas.

In another embodiment, a supplemental catalyst 84 is used in conjunction with the supplemental activation source 86. The supplemental catalyst 84 may either be placed in a stationary position adjacent the supplemental activation source 86 (stationary configuration), similar to that shown in FIG. 2, or a catalyst powder may be injected anywhere upstream of the supplemental activation source 86 (catalyst injection configuration), similar to that shown in FIG. 1. In the stationary configuration, the catalyst 84 is preferably disposed in a stationary position outside of, or within, outlet duct 34. In the catalyst injection configuration, catalyst powder may be injected at the supplemental activation source 86 or at SNCR, SCR, or AEA unit 88.

Figure 5:
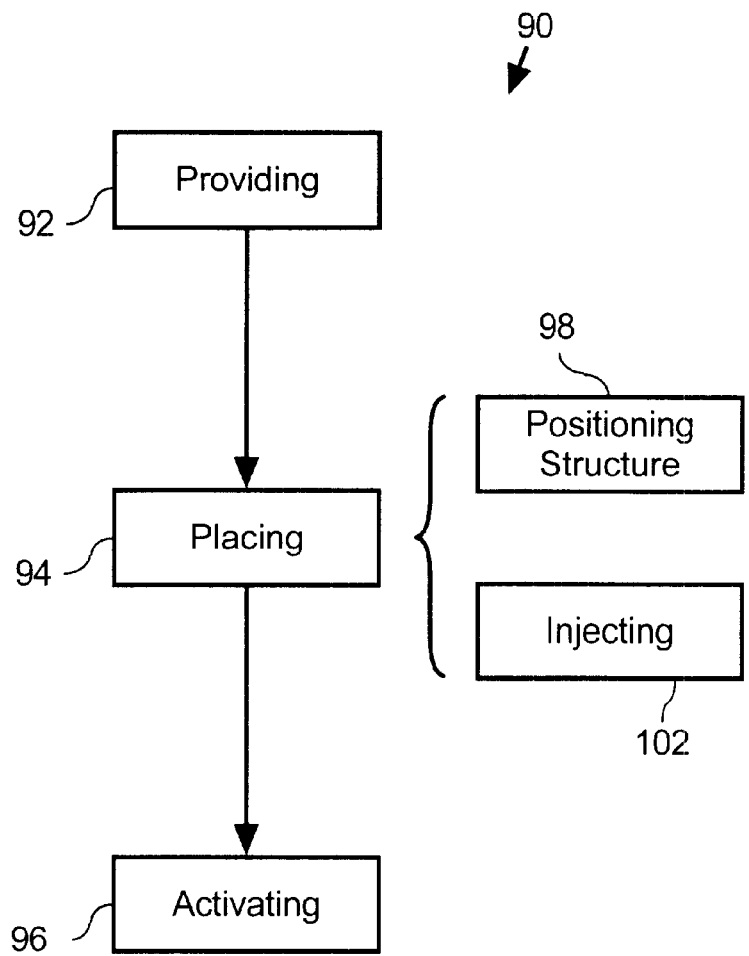
FIG. 5 illustrates a method for decreasing the concentration of contaminants within a gas stream in accordance with the embodiment of the invention described in relation to FIG. 4.

FIG. 5 illustrates a method 90 for decreasing the concentration of contaminants, such as $NO_X$ or reducing agents, present in a gas stream in accordance with the embodiment of the invention described in relation to FIG. 4. A supplemental activation source 86 (FIG. 4) is provided (step 92) downstream of a $NO_X$ reducing unit 88 or 89 (FIG. 4). Although not an essential step, a catalyst 84 (FIG. 4) may be placed into the system (step 94). The supplemental activation source is then activated (step 96) to both further reduce any $NO_X$ present in the flue gas stream and to reduce any reducing agents in the flue gas stream, such as ammonia or urea, by promoting reactions between $NO_X$ and the reducing agent on the flyash surface. In the embodiment where a catalyst is placed into the system (step 94), any $NO_X$ present in the flue gas further reacts with the catalyst to reduce $NO_X$ concentration.

The placing (step 94) of the supplemental activation source 86 (FIG. 4) can include either positioning (step 98) a stationary supplemental catalyst structure within the flue gas stream (stationary configuration), similar to that described in relation to FIG. 2, or injecting (step 102) a powder catalyst into the flue gas stream (catalyst injection configuration), similar to that described in relation to FIG. 1. The activation step (step 96) comprises applying energy to the supplemental catalyst utilizing one or more supplemental activating sources, such as an ultraviolet (UV) energy source, an electromagnetic energy source, a microwave energy source, an electric field energy source, an electric current energy source, a magnetic field energy source, an infrared energy source, or the like.

In this way, the inclusion of a supplemental activation source downstream of a $NO_X$ reducing unit, decreases the concentration of reducing agents within a flue gas stream while further decreasing any $NO_X$ present in the flue gas.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. An apparatus for decreasing the concentration of contaminants within a flue gas stream, comprising:
   a $NO_X$ reducing unit;
   a duct to receive a flue gas stream from said $NO_X$ reducing unit; and
   an activation source associated with said duct downstream of said $NO_X$ reducing unit,
   such that in use said activation source applies energy, to said flue gas stream to facilitate the removal of contaminants from said flue gas stream.

2. The apparatus of claim 1, wherein said activation source is disposed between a boiler and a stack.

3. The apparatus of claim 1, wherein said activation source is disposed in a particulate collection device.

4. The apparatus of claim 1, wherein said $NO_X$ reducing unit is selected from a group consisting of: a Selective Catalytic Reduction (SCR) unit, a Selective Non-Catalytic Reduction (SNCR) unit, a low $NO_X$ burner unit, and an Advanced Energy Activation (AEA) unit.

5. The apparatus of claim 1, wherein said activation source is selected from a group consisting of: an ultraviolet source, an electromagnetic energy source, a microwave energy source, an electric field energy source, an electric current energy source, a magnetic field energy source, and an infrared energy source.

6. The apparatus of claim 1, wherein said apparatus further comprises an energy activated catalyst disposed within said flue gas stream adjacent said energy activation source.

7. The apparatus of claim 6, wherein said energy activated catalyst is disposed in a stationary position within said flue gas stream.

8. The apparatus of claim 6, wherein said energy activated catalyst is a catalyst powder that is injected into said flue gas stream.

9. The apparatus of claim 8, wherein said catalyst powder is injected into said flue gas stream upstream of said activation source.

10. The apparatus of claim 1, wherein said contaminants include $NO_X$.

11. The apparatus of claim 1, wherein said contaminants include reducing agents.

12. The apparatus of claim 11, wherein said reducing agents are selected from a group consisting of: ammonia and urea.

13. A method of decreasing the concentration of contaminants within a flue gas stream, said method comprising the steps of:
   providing an activation source downstream of a $NO_X$ reducing unit, where said activation source is associated with a duct configured to convey a flue gas stream; and activating said activation source to facilitate the removal of contaminants from said flue gas stream.

14. The method of claim 13, wherein said activating step comprises energizing said activation source to remove $NO_X$ from said flue gas stream.

15. The method of claim 13, wherein said activating step comprises energizing said activation source to remove reducing agents from said flue gas stream.

16. The method of claim 13, wherein said method further comprises the step of placing an energy activated catalyst within said flue gas stream, adjacent said energy activation source.

17. The method of claim 16, wherein said placing step includes the step of positioning a stationary energy activated catalyst structure into said flue gas stream.

18. The method of claim 16, wherein said placing step includes the step of injecting a catalyst powder into said flue gas stream.

19. The method of claim 18, wherein said injecting step includes the step of introducing a catalyst powder into said flue gas stream upstream of said activation source.

20. The method of claim 18, wherein said injecting step includes the step of introducing a catalyst powder into said flue gas stream at said $NO_X$ reducing unit.

\* \* \* \* \*